US012806982B2

(12) United States Patent
Iwabuchi

(10) Patent No.: US 12,806,982 B2
(45) Date of Patent: Nov. 24, 2026

(54) REPLACEMENT DOOR MEMBER

(71) Applicant: RESONAC CORPORATION, Tokyo (JP)

(72) Inventor: Masayoshi Iwabuchi, Tagawa (JP)

(73) Assignee: RESONAC CORPORATION, Tokyo (JP)

( * ) Notice: Subject to any disclaimer, the term of this patent is extended or adjusted under 35 U.S.C. 154(b) by 287 days.

(21) Appl. No.: 18/696,615

(22) PCT Filed: Jul. 24, 2023

(86) PCT No.: PCT/JP2023/027067
§ 371 (c)(1),
(2) Date: Mar. 28, 2024

(87) PCT Pub. No.: WO2025/022537
PCT Pub. Date: Jan. 30, 2025

(65) Prior Publication Data
US 2026/0131644 A1 May 14, 2026

(51) Int. Cl.
*B60J 10/70* (2016.01)
*B60J 1/18* (2006.01)
*B60J 5/10* (2006.01)

(52) U.S. Cl.
CPC ................. *B60J 10/70* (2016.02); *B60J 1/18* (2013.01); *B60J 5/10* (2013.01)

(58) Field of Classification Search
CPC ....... B60J 1/18; B60J 5/10; B60J 5/101; B60J 10/70
USPC ................................ 296/146.2, 146.3, 146.8
See application file for complete search history.

(56) References Cited

U.S. PATENT DOCUMENTS 8,727,422 B2 * 5/2014 Iwabuchi ................. B60J 5/107 296/106
2016/0075216 A1 * 3/2016 Kamimura ............... B60J 5/107 296/146.2
2016/0167492 A1 * 6/2016 Ikeda ....................... B60J 5/101 296/146.2

FOREIGN PATENT DOCUMENTS

CN 105711388 A * 6/2016 .............. B60J 5/107
JP 59-099872 7/1984
JP 2000-103008 4/2000
JP 2013-220688 10/2013
JP 5705777 4/2015

OTHER PUBLICATIONS

International Search Report issued Sep. 19, 2023 in International Application No. PCT/JP2023/027067.

* cited by examiner

*Primary Examiner* — Jason S Daniels
(74) *Attorney, Agent, or Firm* — Wenderoth, Lind & Ponack, L.L.P.

(57) ABSTRACT

A replacement door member includes a panel member that defines a vehicle door and does not have a door glass bonded thereto, and an adhesive that has residual curing ability, is at a bonding area for the door glass on the panel member, and includes a flat surface at a portion on a side opposite from the panel member.

8 Claims, 7 Drawing Sheets

REPLACEMENT DOOR MEMBER

TECHNICAL FIELD

The present disclosure relates to a replacement door member.

BACKGROUND ART

A replacement product for a vehicle back door is disclosed in Japanese Patent No. 5705777. In this back door replacement product, surface treatment is performed to a bonding site for a rear window glass on an inner panel, and a portion of curable adhesive is provided on the surface treated portion. This curable adhesive portion is cured in a state in which the door glass is not yet bonded.

SUMMARY OF INVENTION

Technical Problem

However, in the back door replacement product disclosed in Japanese Patent No. 5705777, a surface layer side of the curable adhesive portion is cut in a commercial repair shop and then, after new adhesive has been coated onto the cut portion of the curable adhesive portion, the door glass is bonded via the adhesive. In such technology disclosed in Japanese Patent No. 5705777, a task to fit a door glass to a back door replacement product is complicated, and so there is a desire to improve a task to fit a door glass to a back door replacement product in a commercial repair shop.

The present disclosure provides a replacement door member in which a task to fit a door glass is simplified.

Solution to Problem

Means to address the above issues include the following aspects.

<1>

A replacement door member, including:

a panel member that configures a vehicle door and does not have a door glass bonded thereto; and an adhesive that has residual curing ability, that is provided at a bonding area for the door glass on the panel member, and that includes a flat surface at a portion of the adhesive on the opposite side from the panel member.

<2>

The replacement door member of <1>, wherein a protective material is stuck to the flat surface.

<3>

The replacement door member of <1> or <2>, wherein the adhesive is provided continuously along a window frame for the door glass formed by the panel member.

<4>

The replacement door member of any one of <1> to <3>, wherein the panel member is made from a resin.

<5>

The replacement door member of <1>, wherein:

the panel member includes:

a first of the panel member; and a second of the panel member joined to the first panel member, and the adhesive is provided so as to extend from the first panel member to the second panel member.

<6>

The replacement door member of <5>, wherein at least one out of the first panel member or the second panel member is made from a resin.

<7>

The replacement door member of <5> or <6>, wherein the adhesive is provided continuously along a window frame for the door glass formed by the first panel member to the second panel member.

<8>

The replacement door member of any one of <5> to <7>, wherein:

the first panel member configures an inner panel disposed at a vehicle inner side of the vehicle door; and the second panel member configures an outer panel disposed at a vehicle outer side of the vehicle door.

<9>

The replacement door member of any one of <1> to <8>, wherein the vehicle door is a vehicle back door.

Advantageous Effects

The present disclosure enables a replacement door member to be provided that has a simple task for fitting a door glass.

DESCRIPTION OF EMBODIMENTS

Detailed description follows regarding embodiments for implementing the present disclosure. However, the present disclosure is not limited by the following embodiments. The configuration elements in the following embodiments are not essential, unless explicitly stated otherwise. Similar applies to numerical values and ranges thereof, these do not limit the present disclosure.

A replacement door member according to an exemplary embodiment of the present disclosure includes a panel member that configures a vehicle door and does not have a door glass bonded thereto, and an adhesive that has residual curing ability, that is provided at a bonding area for the door glass on the panel member, and that includes a flat surface at a portion of the adhesive on the opposite side from the panel member. Although specific examples of replacement door members will be described below with reference to the drawings, the present disclosure is not limited thereby.

First Exemplary Embodiment

Description follows regarding a replacement door member 20 of a first exemplary embodiment.

Figure 1:
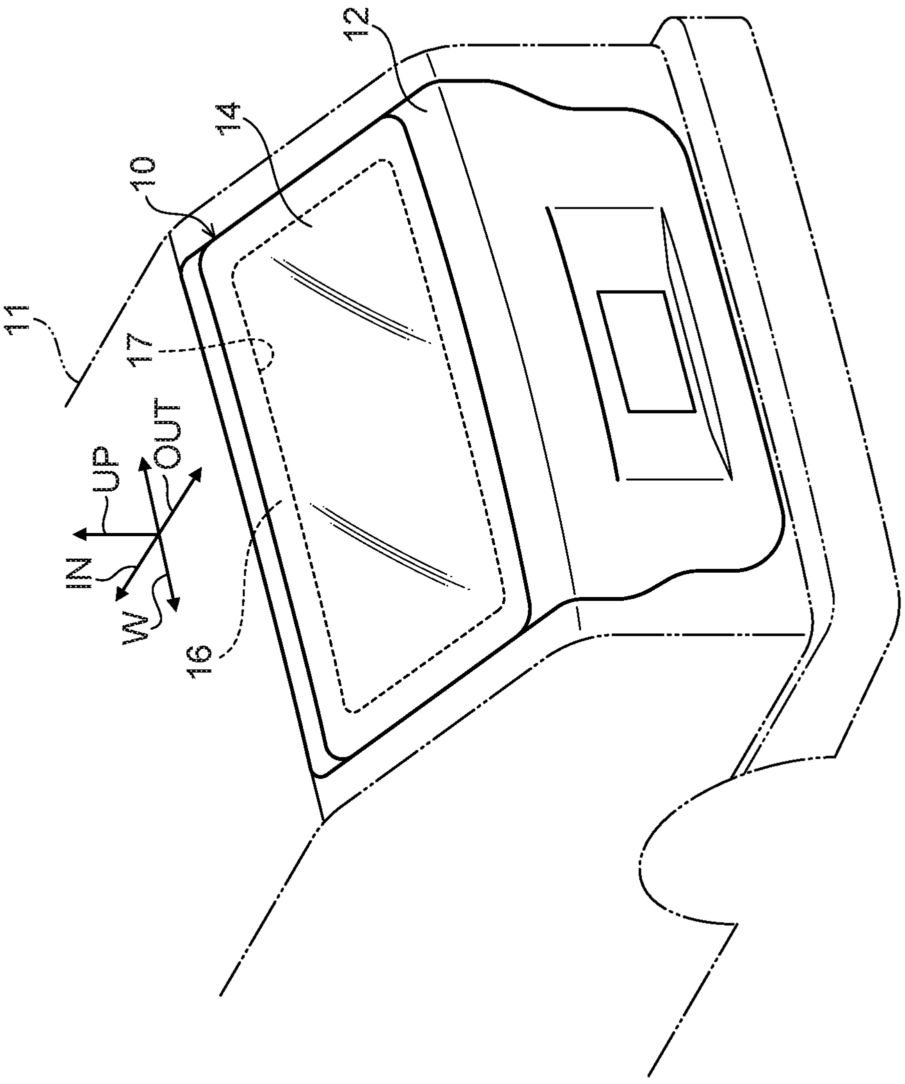
FIG. 1 is a perspective view of a vehicle back door applicable for a replacement door member of a first exemplary embodiment of the present disclosure.

The replacement door member 20 of the present exemplary embodiment (see FIG. 2) is employed as a replacement product for a vehicle back door 10 (see FIG. 1). Note that the vehicle back door 10 of the present exemplary embodiment (hereinafter simply referred to as "back door 10") is a back door of a car.

First description follows regarding the back door 10. FIG. 1 illustrates a back door 10 in a state closing off a back door opening (omitted in the drawings) of a vehicle body 11, as illustrated by double-dot broken lines. In FIG. 1 an arrow UP indicates a vehicle upward direction, an arrow W indicates a vehicle width direction, an arrow IN indicates a vehicle inner side (vehicle cabin inside), and arrow OUT indicates a vehicle outer side. The back door 10 is fitted to the vehicle body 11, and has a function to open and close the back door opening.

The back door 10 includes an inner panel (omitted in the drawings) disposed at the vehicle inner side, and an outer panel 12 disposed at a vehicle outer side. The back door 10 includes a window frame 16 fitted with a rear window glass 14, serving as a door glass. For the window frame 16, the rear window glass 14 is fitted so as to cover an opening 17 inside the window frame 16 from the vehicle outer side. In the present exemplary embodiment, the rear window glass 14 is, as an example, fitted via adhesive to the window frame 16 provided at the outer panel 12 of the back door 10.

Next, description follows regarding the replacement door member 20. The replacement door member 20 is a replacement product for replacing the back door 10 in cases in which the back door 10 has become defective, such as in an accident. The rear window glass 14 of the back door 10 tends not to be damaged in an accident or the like, and is often reusable. This means that the replacement door member 20 is shipped in a state in which the rear window glass 14 has not been fitted thereto. In other words, the rear window glass 14 is not included in the replacement door member 20 as shipped.

Figure 2:
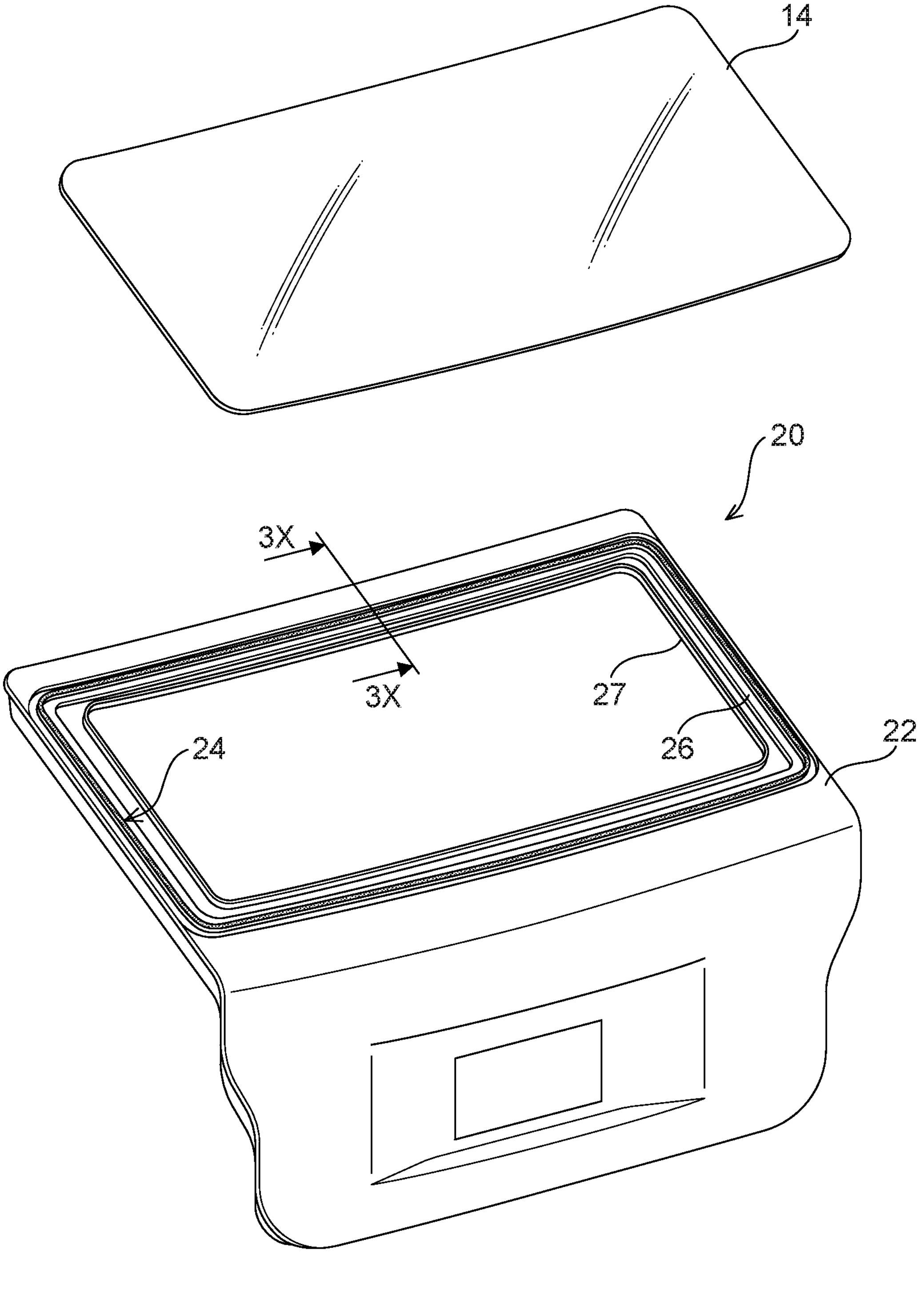
FIG. 2 is a perspective view of a replacement door member of the first exemplary embodiment of the present disclosure.

The replacement door member 20 includes, as illustrated in FIG. 2, an outer panel 22, and adhesive 24. Note that the outer panel 22 is an example of a panel member of the present disclosure.

The outer panel 22 is a panel member corresponding to the outer panel 12 disposed at the vehicle outer side of the back door 10. Namely, in the present exemplary embodiment, the shape of the outer panel 22 is the same as the shape of the outer panel 12. Moreover, the outer panel 22 of the present exemplary embodiment is, as an example, made from a resin.

Note that examples of resin for the outer panel 22 include, for example, a polypropylene (PP) resin, an acrylonitrile butadiene styrene (ABS) copolymer resin, or the like, however the present disclosure is not limited thereto.

An inner panel 23 is joined to the outer panel 22. The inner panel 23 corresponds to an inner panel (omitted in the drawings) disposed at a vehicle outer side of the back door 10. Namely, in the present exemplary embodiment, the shape of the inner panel 23 is the same as the shape of the inner panel of the back door 10. Moreover, the inner panel 23 of the present exemplary embodiment is, for example, made from a resin.

Note that examples of resin for the inner panel 23 include, for example, a glass fiber reinforced polypropylene resin, however the present disclosure is not limited thereto.

Moreover, a window frame 26 for fitting the rear window glass 14 to is provided at the replacement door member 20. The window frame 26 corresponds to the window frame 16 of the back door 10. Moreover, the window frame 26 of the present exemplary embodiment is, as an example, provided at the outer panel 22. The rear window glass 14 is to be fitted to the window frame 26 via the adhesive 24 so as to cover an opening 27 at the inside of the window frame 26 from the vehicle outer side.

The adhesive 24 is, as illustrated in FIG. 2, provided at a bonding area for the rear window glass 14 on the outer panel 22. In the present exemplary embodiment, as an example, the adhesive 24 is provided continuously along the window frame 26 of the outer panel 22. Specifically, the adhesive 24 is provided continuously along the window frame 26 so as to surround the opening 27. Moreover, the adhesive 24 has residual curing ability (is curable). In other words, the adhesive 24 is an adhesive prior to complete curing. This means that when bonding the rear window glass 14 to the window frame 26 of the outer panel 22, the rear window glass 14 can be bonded to the window frame 26 even without cutting a portion of cured adhesive off and coating with new adhesive. Note that although an adhesive effect is obtained even when the adhesive 24 is provided partially along the window frame 26 of the outer panel 22, the adhesive 24 is more preferably provided continuously.

Figure 3:
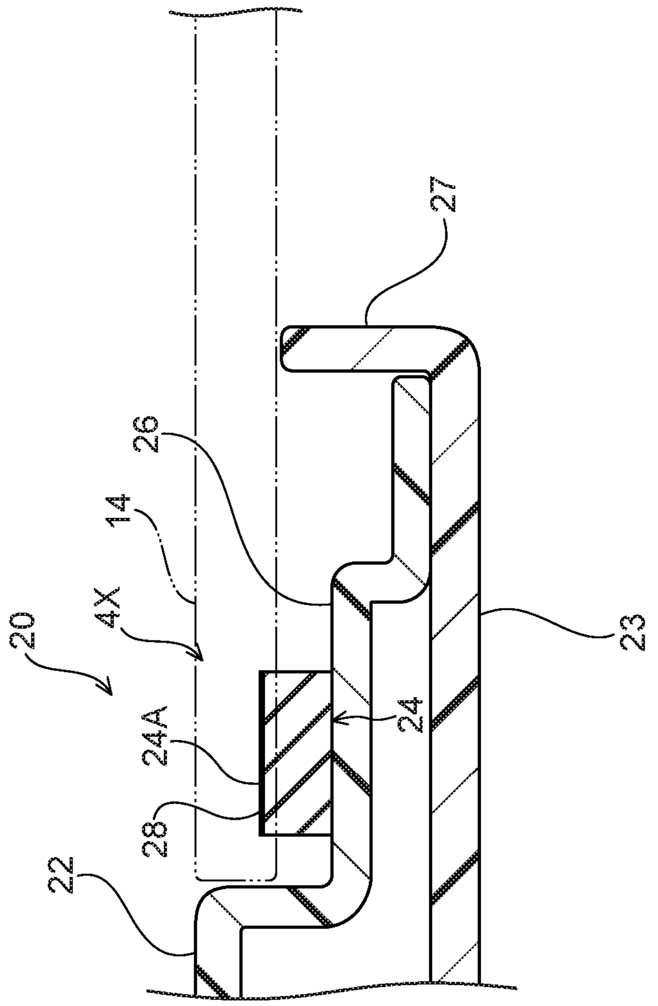
FIG. 3 is a cross-section taken along line 3X-3X of FIG. 2.

The adhesive 24 includes a flat surface 24A at a portion on the opposite side from the outer panel 22, as illustrated in FIG. 3. Specifically, the flat surface 24A is provided at a portion of the adhesive 24 for bonding to a face on the vehicle cabin side of the rear window glass 14. In the present exemplary embodiment, as an example, the flat surface 24A is also provided around a whole circuit similarly to the adhesive 24 being provided around a whole circuit of the window frame 26. Note that examples of the adhesive 24 include, for example, a liquid one-part curing urethane based adhesive and a liquid two-part curing urethane based adhesive, however the present disclosure is not limited thereto.

Figure 4:
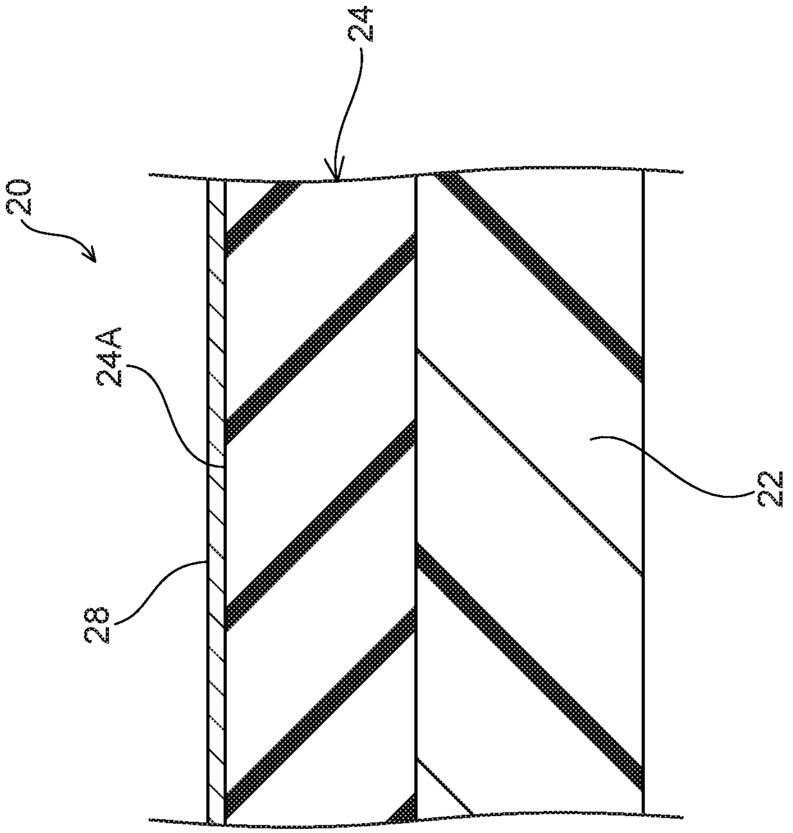
FIG. 4 is an enlarged cross-section of a periphery of the adhesive illustrated in FIG. 3.

As illustrated in FIG. 3 and FIG. 4, a protective material 28 is stuck to the flat surface 24A of the adhesive 24. The protective material 28 is a member for protecting the flat surface 24A. In the present exemplary embodiment, as an example, the protective material 28 is formed in a film shape. Note that the adhesive 24 can bond the rear window glass 14 to the window frame 26 of the outer panel 22 as long as the flat surface 24A to which the rear window glass 14 is bonded has residual curing ability.

The flat surface 24A of the adhesive 24 of the present exemplary embodiment is, as an example, formed by placing the protective material 28 on a portion of the adhesive 24 on the opposite side from the outer panel 22 after the adhesive 24 has been coated on a bonding area on the outer panel 22, and by pressing the adhesive 24 flat using a tool such as, for example, a roller or the like. Note that the protective material 28 may also be placed in position after the adhesive 24 has been flattened and the flat surface 24A has been formed.

Note that painting is performed on the outer panel 22 in the present exemplary embodiment. Thus primer treatment for painted surfaces is performed over a wider range than the bonding area on the outer panel 22, and the adhesive 24 may also be coated onto the primer treated portion. Performing the primer treatment for painted surfaces over the wider range than the bonding area on the outer panel 22 improves a joint strength generated by the adhesive 24 between the window frame 26 and the rear window glass 14.

Next, description follows regarding operation and advantageous effects of the present exemplary embodiment.

Figure 5:
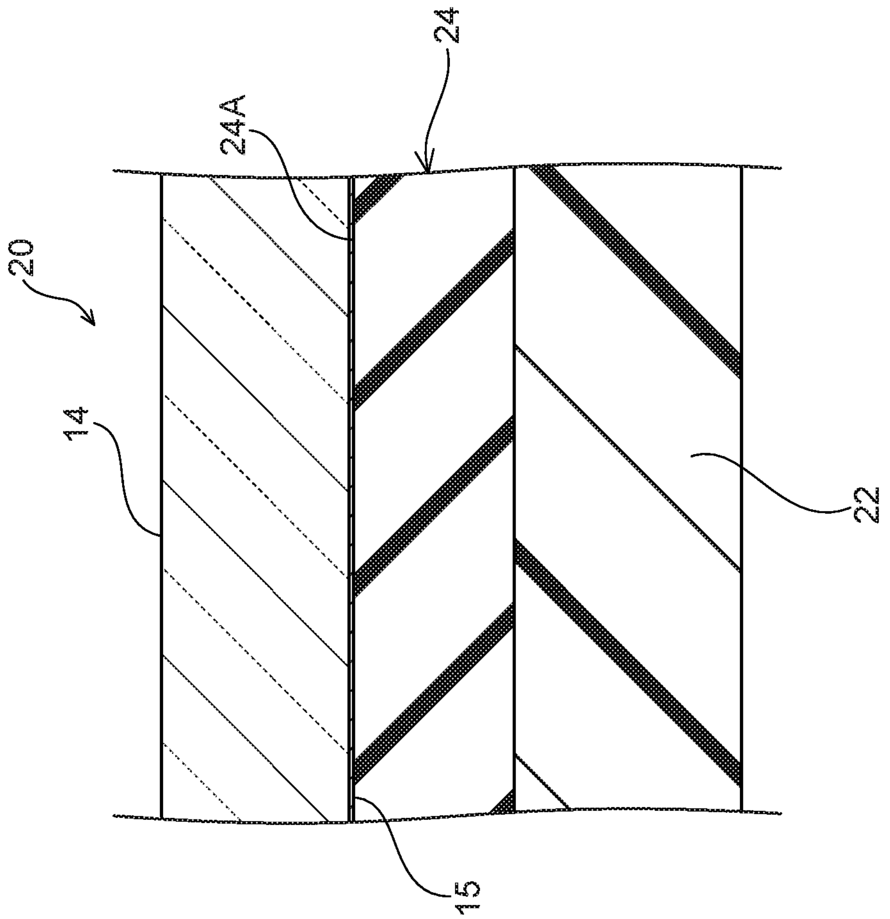
FIG. 5 is a cross-section corresponding to FIG. 4, and illustrates a state in which a door glass has been fitted to a replacement door member via adhesive.

When the replacement door member 20 of the present exemplary embodiment is being used to replace the back door 10, first the back door 10 is removed from the vehicle body 11. Moreover, the rear window glass 14 is removed from the back door 10, and primer treatment is performed to a bonding area of the rear window glass 14. Then after this has been performed, the protective material 28 is peeled off from the adhesive 24 of the replacement door member 20, the position of a primer treated portion 15 of the rear window glass 14 that has been subjected to primer treatment and a position of the flat surface 24A are aligned with each other, and the rear window glass 14 is fitted to the replacement door member 20 via the adhesive 24 by pressing the rear window glass 14 against the window frame 26, as illustrated in FIG. 5. Replacement of the back door 10 by the replacement door member 20 is completed by fitting the replacement door member 20 with the rear window glass 14 bonded thereto onto the vehicle body 11.

Note that primer treatment is processing to undercoat (first-coat) a coating material (primer) having excellent adhesive properties onto a material (for example, a resin material, a glass material, a metal material) to which something is going to be bonded. The adhesive properties of the adhesive 24 to this material are improved by interposing this undercoat surface.

With the replacement door member 20 of the present exemplary embodiment, as long as the adhesive 24 has residual curing ability there is, for example, in comparison to a configuration with cured adhesive (lacking residual curing ability), no need to cut a cured portion of adhesive away and to coat new adhesive. This means that in the replacement door member 20 of the present exemplary embodiment a task to fit the rear window glass 14 to the window frame 26 is simplified.

Moreover, with the replacement door member 20 of the present exemplary embodiment, the adhesive 24 has been coated onto the window frame 26 and press-flattened to provide the flat surface 24A, and so there is no need to press-flatten adhesive coated onto a window frame in a commercial repair shop. This means that with the replacement door member 20 of the present exemplary embodiment, a task to fit the rear window glass 14 to the window frame 26 is simplified.

With the replacement door member 20 of the present exemplary embodiment, the task to fit the rear window glass 14 to the window frame 26 is simplified, and so the time needed for a task to replace the back door 10 on the vehicle body 11 with the replacement door member 20 is shortened.

With the replacement door member 20 of the present exemplary embodiment, the protective material 28 is stuck to the flat surface 24A of the adhesive 24. A state in which the flat surface 24A of the adhesive 24 has a residual curing ability is maintained by the protective material 28. Moreover, the flat surface 24A of the adhesive 24 is protected from foreign objects and the like by the protective material 28. This means that the adhesive properties of the adhesive 24 can be secured for when the rear window glass 14 is fitted to the replacement door member 20.

In the replacement door member 20 of the present exemplary embodiment, the adhesive 24 is provided continuously along the window frame 26 and so, for example, the sealing ability between the replacement door member 20 and the rear window glass 14 generated by the adhesive 24 is higher than in a configuration in which the adhesive 24 is provided intermittently along the window frame 26.

In the replacement door member 20 of the present exemplary embodiment, the outer panel 22 and the inner panel 23 are made from a resin and so, for example, a saving in weight is achieved compared to a configuration in which one or other out of the outer panel 22 or the inner panel 23 is made from a metal. This means that a task to replace the back door 10 with the replacement door member 20 in a commercial repair shop is easier.

Although in the replacement door member 20 of the first exemplary embodiment the window frame 26 is provided at the outer panel 22, the present disclosure is not limited to such a configuration. For example, a window frame 26 may be provided at the inner panel 23. In such cases the rear window glass 14 is fitted via the adhesive 24 to the window frame 26 of the inner panel 23. Note that the primer treatment is preferably performed to a bonding area on the inner panel 23.

Although in the replacement door member 20 of the first exemplary embodiment the outer panel 22 and the inner panel 23 are both made from a resin, the present disclosure is not limited thereto. For example, at least one out of the outer panel 22 or the inner panel 23 may be formed from a material other than resin (for example a metal material). In such cases too, primer treatment is preferably performed to the bonding area on the outer panel 22 or the inner panel 23.

Second Exemplary Embodiment

Description follows regarding a replacement door member 40 of a second exemplary embodiment.

The replacement door member 40 is, similarly to the replacement door member 20, a replacement product for replacing the back door 10. The replacement door member 40 is, similarly to the replacement door member 20, shipped in a state in which a rear window glass 14 has not been fitted.

Figure 6:
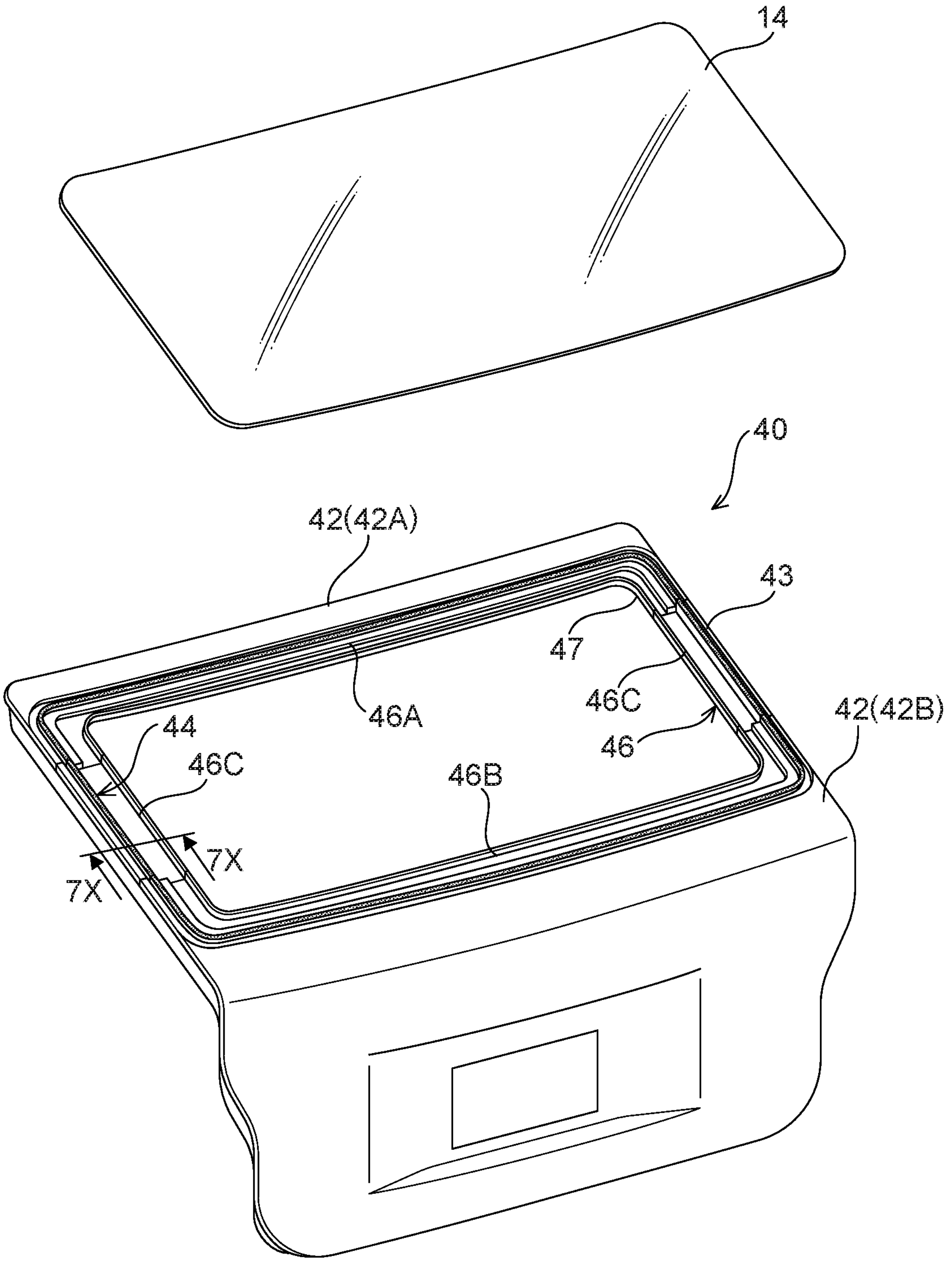
FIG. 6 is a perspective view of a replacement door member of a second exemplary embodiment of the present disclosure.

The replacement door member 40 includes, as illustrated in FIG. 6, an outer panel 42, an inner panel 43, and an adhesive 44. Note that the outer panel 42 is an example of a panel member of the present disclosure, and is an example of an outer panel. The inner panel 43 is an example of a panel member of the present disclosure, and is an example of an inner panel.

The outer panel 42 is a panel member corresponding to the outer panel 12 disposed at a vehicle outer side of the back door 10, and includes an outer upper 42A and an outer lower 42B. Note that the outer upper 42A is a first panel member of the present disclosure, and the outer lower 42B is a second panel member of the present disclosure.

The outer upper 42A is a panel member that configures an upper portion side of the outer panel 42. Moreover, the outer upper 42A is a joined to an upper portion side of the inner panel 43.

The outer lower 42B is a panel member configuring a lower portion side of the outer panel 42. Moreover, the outer lower 42B is joined to a lower portion side of the inner panel 43.

The outer upper 42A and the outer lower 42B of the present exemplary embodiment are, as an example, made from a resin. Note that the resin of the outer upper 42A and the outer lower 42B may employ a similar resin to the outer panel 22.

The inner panel 43 is a panel member corresponding to an inner panel (omitted in the drawings) disposed at a vehicle inner side of the back door 10, and is joined to the outer upper 42A and the outer lower 42B as described above. The inner panel 43 of the present exemplary embodiment is, as an example, made from a resin. Note that the resin of the inner panel 43 may employ a similar resin to the inner panel 23.

Moreover, a window frame 46 for fitting a rear window glass 14 to is provided at the replacement door member 40. The window frame 46 corresponds to the window frame 16 of the back door 10. Moreover, the window frame 46 of the present exemplary embodiment is, as an example, formed by the outer panel 42 and the inner panel 43. Specifically, the window frame 46 is formed by the outer upper 42A and the outer lower 42B, and the inner panel 43. An upper framework 46A of the window frame 46 is configured by the outer upper 42A, and a lower framework 46B of the window frame 46 is configured by the outer lower 42B, with a left-right pair of vertical frameworks 46C of the window frame 46 configured by the inner panel 43. In the window frame 46, the rear window glass 14 is fitted via the adhesive 44 so as to cover an opening 47 formed inside the window frame 46 from the vehicle outer side.

The adhesive 44 is provided at bonding areas for the rear window glass 14 on the outer panel 42 and the inner panel 43. Specifically, the adhesive 44 is provided at bonding areas for the rear window glass 14 on the outer upper 42A, the outer lower 42B, and the inner panel 43. In the present exemplary embodiment, as an example, the adhesive 44 is provided continuously along the window frame 46 formed by the outer panel 42 and the inner panel 43. Specifically, the adhesive 44 is provided so as to extend from the outer upper 42A configuring the upper framework of the window frame 46, the outer lower 42B configuring the lower framework of the window frame 46, and the inner panel 43 configuring the pair of vertical frameworks of the window frame 46. In other words, the adhesive 44 is provided continuously along the window frame 46 so as to surround the opening 47.

Similarly to the adhesive 24, the adhesive 44 has residual curing ability. This means that when the rear window glass 14 is being bonded to the window frame 46, the rear window glass 14 can be bonded to the window frame 46 even without cutting a portion of cured adhesive off and coating with new adhesive.

Figure 7:
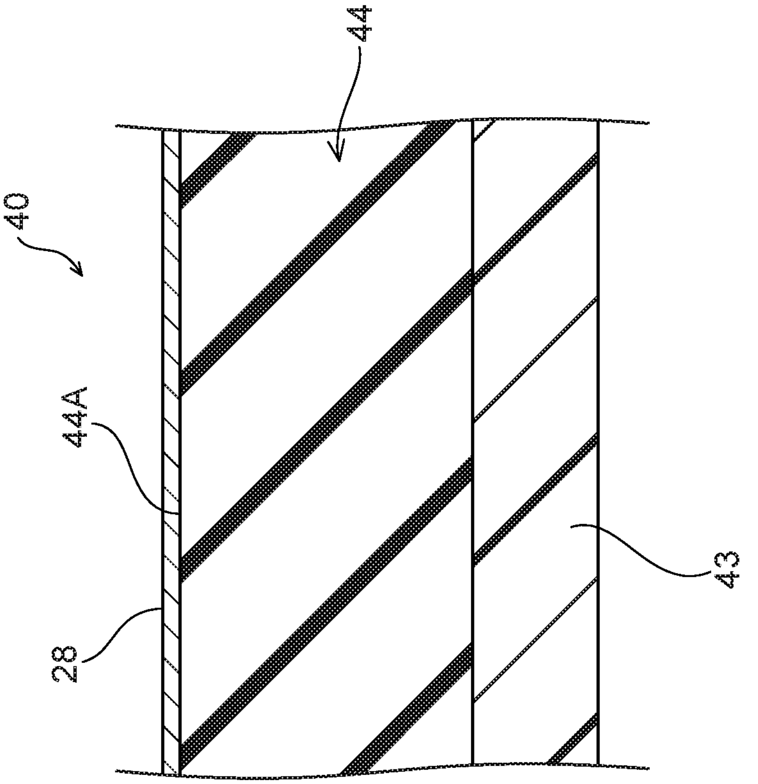
FIG. 7 is a cross-section taken along line 7X-7X of FIG. 6.

Moreover, the adhesive 44 includes, similarly to the adhesive 24 and as illustrated in FIG. 7, a flat surface 44A at a portion on the opposite side from the outer panel 42 and the inner panel 43. Specifically, the flat surface 44A is provided at a portion of the adhesive 44 for bonding to a face on the vehicle cabin side of the rear window glass 14. In the present exemplary embodiment, as an example, the flat surface 44A is also provided around a whole circuit similarly to the adhesive 44 being provided around a whole circuit of the window frame 46.

A protective material 28 may, similarly to the adhesive 24, be stuck to the flat surface 44A of the adhesive 44. The flat surface 44A of the adhesive 44 of the present exemplary embodiment may be formed by a method similar to with the adhesive 24. Note that similar materials to the adhesive 24 may be employed as the adhesive 44.

Note that painting is performed on the outer panel 42 (the outer upper 42A and the outer lower 42B) of the present exemplary embodiment, similarly to the outer panel 22. This means that, similarly to the outer panel 22, primer treatment for painted surfaces may be performed over a wider range than the bonding area of the outer panel 42, and the adhesive 44 may be coated onto the primer treated portion. Performing the primer treatment for painted surfaces over the wider range than the bonding area of the outer panel 42 improves a joint strength generated by the adhesive 44 between the upper framework and the lower framework of the window frame 46 and the rear window glass 14.

A surface on the vehicle outer side of the inner panel 43 is not painted in the present exemplary embodiment. Namely, the surface on the vehicle outer side of the inner panel 43 is left unpainted. Flame treatment may be performed over a range on the unpainted surface of the inner panel 43 configured by at least the pair of vertical frameworks of the window frame 46. Furthermore, primer treatment may be performed on the flame treated portion of the unpainted surface of the inner panel 43, and then the adhesive 44 may be coated onto the primer treated portion. Performing the primer treatment for painted surfaces over the wider range than the bonding area of the inner panel 43 improves a joint strength generated by the adhesive 44 between the pair of vertical frameworks of the window frame 46 and the rear window glass 14.

Note that the flame treatment performed on the inner panel 43 is surface treatment in which the resin is seared with a gas flame to introduce oxygen bonds or double bond into molecules on the resin surface.

Description follows regarding the operation of the present exemplary embodiment. Note that explanation will be omitted as appropriate regarding operation obtained by configuration similar to that of the first exemplary embodiment.

In the replacement door member 40 of the present exemplary embodiment, the adhesive 44 has residual curing ability and so, for example compared to a configuration in which the adhesive is cured (has no residual curing ability), there is no need to cut a portion of cured adhesive off and to coat with new adhesive. This means that with the replacement door member 40 of the present exemplary embodiment, a task to fit the rear window glass 14 to the window frame 46 is simplified.

Moreover, with the replacement door member 40 of the present exemplary embodiment, the adhesive 44 has been coated onto the window frame 46 and press-flattened to provide the flat surface 44A, and so there is no need to press-flatten adhesive coated onto the window frame in a commercial repair shop. This means that with the replacement door member 40 of the present exemplary embodiment, a task to fit the rear window glass 14 to the window frame 46 is simplified.

In the replacement door member 40 of the present exemplary embodiment, the adhesive 44 is provided so as to extend from the outer panel 42 (the outer upper 42A and the outer lower 42B) and the inner panel 43, and so in comparison to a configuration in which the adhesive 44 is not provided straddling between the outer panel 42 and the inner panel 43, the sealing ability generated by the adhesive 24 is improved between the replacement door member 20 and the rear window glass 14. In particular, in the replacement door member 40 of the present exemplary embodiment, the adhesive 44 is provided continuously along the window frame 46 and so, for example, the sealing ability generated by the adhesive 44 between the replacement door member 40 and the rear window glass 14 is higher than a configuration in which the adhesive 44 is provided intermittently along the window frame 46.

Although in the replacement door member 40 of the second exemplary embodiment the outer panel 42 (the outer upper 42A and the outer lower 42B) and the inner panel 43 are made from a resin, the present disclosure is not limited thereto. For example, at least one from out of the outer panel 42 or the inner panel 43 may be formed from a material other than resin (for example a metal material). In such cases too, primer treatment is preferably performed to the bonding area of the outer panel 42 or the inner panel 43.

Other Exemplary Embodiments

Although in the first exemplary embodiment and the second exemplary embodiment, the technology of the present disclosure is applied to the replacement door members 20, 40 that are replacement products for the back door 10, the technology of the present disclosure is not limited thereto. For example, the technology of the present disclosure may be applied to a door replacement product other than a back door of a vehicle.

Preferable exemplary embodiments of the present disclosure have been described above, however the present disclosure is not necessarily limited to the above exemplary embodiments, and appropriate modifications may be implemented within a scope not departing from the spirit thereof.

The invention claimed is:

1. A replacement door member, comprising:
- a panel member that defines a vehicle door and does not have a door glass bonded thereto;
- an adhesive that is prior to complete curing, has residual curing ability, is at a bonding area for the door glass on the panel member, and includes a flat surface at a portion of the adhesive on a side opposite from the panel member; and
- a protective material that is stuck to the flat surface and configured to maintain a state in which the adhesive has residual curing ability.

2. The replacement door member of claim 1, wherein the adhesive is continuous along a window frame for the door glass defined by the panel member.

3. The replacement door member of claim 1, wherein the panel member is made from a resin.

4. The replacement door member of claim 1:
- wherein the panel member comprises:
  - a first panel member; and
  - a second panel member joined to the first panel member, and
- wherein the adhesive extends from the first panel member to the second panel member.

5. The replacement door member of claim 4, wherein at least one of the first panel member or the second panel member is made from a resin.

6. The replacement door member of claim 5, wherein the adhesive is continuous along a window frame for the door glass defined by the first panel member and the second panel member.

7. The replacement door member of claim 4, wherein:
- the first panel member defines an inner panel at a vehicle inner side of the vehicle door; and
- the second panel member defines an outer panel at a vehicle outer side of the vehicle door.

8. The replacement door member of claim 1, wherein the vehicle door is a vehicle back door.

* * * * *